United States Patent
Koryabkina et al.

(10) Patent No.: US 7,763,225 B2
(45) Date of Patent: Jul. 27, 2010

(54) PROCESS OF CATALYTIC AMMOXIDATION FOR HYDROGEN CYANIDE PRODUCTION

(75) Inventors: Natalya Koryabkina, Alvin, TX (US); Mikhail Khramov, Pensacola, FL (US); Valerie Monical, Houston, TX (US)

(73) Assignee: Ascend Performance Materials LLC, St. Louis, MO (US)

(*) Notice: Subject to any disclaimer, the term of this patent is extended or adjusted under 35 U.S.C. 154(b) by 419 days.

(21) Appl. No.: 11/767,555

(22) Filed: Jun. 25, 2007

(65) Prior Publication Data

US 2008/0317656 A1    Dec. 25, 2008

(51) Int. Cl.
C01C 3/02    (2006.01)
B01J 27/187    (2006.01)
B01J 27/185    (2006.01)
B01J 27/182    (2006.01)
B01J 27/18    (2006.01)

(52) U.S. Cl. .................. 423/376; 502/208; 502/213; 502/214

(58) Field of Classification Search ................ 423/372, 423/376; 502/208, 211, 213, 305, 306, 307, 502/313, 316, 321, 324, 325
See application file for complete search history.

(56) References Cited

U.S. PATENT DOCUMENTS 3,911,089 A    10/1975   Shiraishi et al
4,377,444 A    3/1983    Wu
4,423,023 A    12/1983   Velenyi et al.
4,457,905 A    7/1984    Ebner
4,485,079 A    11/1984   Brazdil, Jr. et al.
4,511,548 A    4/1985    Attig et al.
6,136,998 A    10/2000   Sasaki et al.
6,204,407 B1   3/2001    Godbole et al.

FOREIGN PATENT DOCUMENTS

| EP | 107638 | 5/1984 |
|---|---|---|
| EP | 322796 | 7/1989 |
| EP | 340909 | 11/1989 |
| EP | 864532 | 9/1998 |
| JP | 07-223812 | * 8/1995 |
| JP | 7223812 | 8/1995 |

OTHER PUBLICATIONS

International Search Report issued in PCT Application PCT/US2008/007818 (Sep. 2008).

* cited by examiner

*Primary Examiner*—Wayne Langel
*Assistant Examiner*—Brittany M Martinez
(74) *Attorney, Agent, or Firm*—Morgan Lewis & Bockius LLP

(57) ABSTRACT

A process for the ammoxidation of an alcohol feed, such as methanol, or a nitrile feed, such as propionitrile, or a mixture thereof, to form hydrogen cyanide uses a modified Mn—P catalyst having the following empirical formula:

$$Mn_a P_1 A_b O_x$$

where A=one or more of K, Ca, Mo, Zn, Fe or mixtures thereof; a=1 to 1.5; b=0.01 to 1.0 and x is a total number of oxygen atoms determined by the oxidation states of the other elements present.

13 Claims, No Drawings

PROCESS OF CATALYTIC AMMOXIDATION FOR HYDROGEN CYANIDE PRODUCTION

BACKGROUND OF INVENTION

1. Field of the Invention

The present invention relates to a process for producing hydrogen cyanide by catalytic ammoxidation using a modified Mn—P catalyst.

2. Description of Related Art

Hydrogen cyanide (HCN) is a very important by-product in nylon synthesis. It is used in the manufacture of methyl methacrylate, nitrilotriacetic acid (NTA, a detergent additive), herbicides, in production of methylthiohydroxybutyric acid (an animal food additive), chelating agents, and many other fine and specialty chemicals. It is used also for gold extraction from ores. Annual production of HCN in United States is about 700,000 tons. About 20% of this HCN is a by-product of acrylonitrile (AN) manufacture: more that 70% is made by DuPont's Andrussow process developed in 1930s, while relatively small amount (less then 10%) is produced via Degussa process.

In the Degussa process $CH_4$ and $NH_3$ react directly inside ceramic tubes coated with platinum. Since the reaction between $CH_4$ and $NH_3$ is highly endothermic (equation 1) high reaction temperatures (1200-1300° C.) are required; the necessary heat is provided by combustion of a fuel on the outside of the tubes.

$$NH_3 + CH_4 \rightarrow HCN + 3H_2 \ (\Delta H_r = 252 \ KJ/mol) \quad (1)$$

Since this process operates in the absence of air, a number of side reactions are eliminated. Moreover, the off gas is nearly pure $H_2$ (96.2%) after scrubbing of HCN and $NH_3$. Conversion of $NH_3$ to HCN is 80-85% and that of $CH_4$ to HCN is 90%.

In the Andrussow process air is added to combust a small amount of $CH_4$ to provide necessary heat for the reaction. Thus production of HCN by this latter process is ammoxidation reaction:

$$NH_3 + 2CH_4 + 3.5O_2 \rightarrow HCN + CO_2 + 5H_2O \ (\Delta H_r = -474 \ KJ/mol) \quad (2)$$

The Andrussow process operates adiabatically at about 1100° C. Optimal feed composition is determined by a compromise between selectivity for conversion of $NH_3$ to HCN, favored by a high $CH_4/NH_3$ ratio at a fixed air/fuel ratio, and overall HCN production rate, favored by a relatively low $CH_4/NH_3$ ratio. Residence time is extremely low (less then 1 ms) to prevent decomposition of HCN product. A typical catalyst in the Andrussow process is 90% wt. Pt and 10% wt. Rh wire gauze. Acceptable catalyst life is 60 to 360 days. About 65-70% of ammonia is converted to HCN and about 10% to $N_2$. The product gases, containing about 6-12% HCN, are rapidly quenched in a waste-heat boiler to 350-400° C. to avoid decomposition of the HCN.

HCN is also produced as a by-product of propylene ammoxidation to acrylonitrile as follows:

$$CH_2=CHCH_3 + 3NH_3 + 3O_2 \rightarrow 3HCN + 6H_2O \ (\Delta H_r = -273 \ kcal/mol) \quad (3)$$

The amount of HCN produced as a by-product in propylene ammoxidation is linked to the amount of produced AN. HCN is a valuable product, and at times its demand exceeds the production of HCN in propylene ammoxidation process. When this happens, methanol is fed together with propylene into the reactors, where it reacts with ammonia and oxygen on AN catalyst to produce HCN as follows:

$$CH_3OH + NH_3 + O_2 \rightarrow HCN + 3H_2O \ (\Delta H_r = -83 \ kcal/mol) \quad (4)$$

However, AN catalysts are optimized for propylene rather than methanol ammoxidation reaction. Besides, introduction of methanol into the propylene ammoxidation feed may reduce the life of the catalyst.

Therefore, there is a need to decouple AN and HCN production, and develop an inexpensive HCN production process. The process would use a catalyst specifically developed to produce HCN from methanol.

There are a number of known catalysts for the ammoxidation of methanol to HCN based on complex metal oxides such as $K_{0.006}Bi_{0.45}Fe_{0.65}P_{0.1}MoOx-50\% \ SiO_2$ that include almost all elements from the periodic table. However, only a few of them have been really tested in the ammoxidation reaction. Some of the known ammoxidation catalysts along with catalytic properties are presented in Table 1.

TABLE 1

Methanol ammoxidation over complex oxide catalysts.

| N | Catalyst composition | Reaction conditions | Catalytic properties* |
|---|---|---|---|
| 1 | $Fe_aCu_bSb_cMo_dMe_eTe_fQ_gO_x/SiO_2$<br>Me = V, W; Q = Mg, Zn, La, Ce, Al, Cr, Mn, Co, Ni, Bi, U, Sn; | T = 350-500° C.<br>$O_2:NH_3:MeOH = 2:1.1:1$ | X = 96-100%,<br>Y = 79-93% |
| 2 | $R_rX_qT_pZ_sFe_tSb_uP_vO_x$<br>R = IA ИIB, IIC, X = Bi, Te;<br>T = Cr, Co, Cu. Ce. Th, B, Sn;<br>Z = V, Mo, W; | T = 300-500° C.<br>$O_2:NH_3:MeOH:H_2O =$<br>2.1:1.2:1:2.25 | S = 82-95%<br>Y = 77-87% |
| 3 | $R_rA_aBi_bCe_cW_dV_eMo_fO_x$<br>R = Cr, Sb; A = K, Na, Rb, Cs, Tl, Sm, Ag, Cu; | T = 300-500° C.<br>$O_2:NH_3:MeOH:H_2O =$<br>2.1:1.2:1:2. | Y = 54-72% |
| 4 | $Fe_aSb_bQ_cR_dO_x$;<br>Q = V, Co, Ni, Cu, Mo, W, Bi;<br>R = B, P, K, Zn, Te; | T = 380-470° C.<br>$O_2:NH_3:MeOH = 1.4:1:1$ | X = 96-99.8%,<br>Y = 91-94% |
| 5 | $Fe_aSb_bP_cX_dQ_eR_fO_x/SiO_2$;<br>X = V, Mo, W; Q = Li, Na, K, Rb. Cs, Mg, Ca, La, Ce, Ti, Zr, Nb, Ta, Cr, Mn, Re, Co, Ni, Cu, Ag, Zn, Al, Sn, Pb;<br>R = B, As, Se, Te; | T = 350-500° C.<br>$O_2:MeOH = 1-10$<br>$NH_3:MeOH = 0.7-2.5$ | X = 80-100%,<br>S = 89-96%<br>Y = 70-94% |

TABLE 1-continued

Methanol ammoxidation over complex oxide catalysts.

| N | Catalyst composition | Reaction conditions | Catalytic properties* |
|---|---|---|---|
| 6 | $Fe_aSb_bP_cV_dMo_eCu_fW_gX_hY_iZ_jO/SiO_2$<br>X = Mg, Zn, La, Ce, Al, Cr, Mn, Co, Ni, Bi, U, Sn; Y = B, Te; Z = Li, Na, K, Rb. Cs, Ca, Ba; | T = 380-470° C.<br>$O_2$:MeOH = 1.3-1.5<br>$NH_3$:MeOH = 0.7-1.1 | X = 98-100%,<br>Y = 78-94.5%. |
| 7 | $Fe_aSb_bP_cV_dMo_eCu_fW_gX_hY_iZ_jO/SiO_2$<br>X = Mg, Zn, La, Ce, Al, Cr, Mn, Co, Ni, Bi, U, Sn; Y = B, Te; Z = Li, Na, K, Rb. Cs, Ca, Ba; | T = 380-470° C.<br>$O_2$:MeOH = 1.3-1.5<br>$NH_3$:MeOH = 1-1.3 | X = 97-100%<br>Y = 80-92% |
| 8 | $Fe_aSb_bP_cM_xO_y$<br>M = V, Mo | T = 440-480° C.<br>$O_2$:$NH_3$:MeOH = 1.6:1:1 | X = 82-100%<br>S = 93.2-94.7% |
| 9 | $Fe_aSb_bP_cV_xCu_yO_z$ | T = 440° C.<br>$O_2$:$NH_3$:MeOH = 1.5:1:1 | Y = 94.5% |

*X - methanol conversion, S - selectivity to HCN, Y - HCN yield.

A large volume of developmental work on methanol ammoxidation was done by Monsanto in the 1980s as a result of which manganese phosphate based catalysts ($Mn_{1.25}PO_x$) were developed for HCN production from methanol. Manganese phosphate based catalysts ($Mn_{1.25}PO_x$) are very simple in preparation, and they can provide up to 90% HCN yield from methanol. The process can be run under conditions close to those of the current AN process and could be retrofitted into an existing AN production plant.

Therefore, a catalyst specifically designed for the production of HCN with increased yields over current technology would be highly advantageous.

BRIEF SUMMARY OF THE INVENTION

The present invention is directed to a modified Mn—P catalyst for the production of hydrogen cyanide (HCN). The modified Mn—P catalyst according to the present invention has the following empirical formula:

$$Mn_aP_1A_bO_x$$

where A=one or more of K, Ca, Mo, Zn, Fe or mixtures thereof; a=1 to 1.5; b=0.01 to 1.0 and x is a total number of oxygen atoms determined by the oxidation states of the other elements present.

The modified Mn—P catalyst is used for ammoxidation of alcohols and/or nitrites for the production of HCN. The process uses a modified Mn—P catalyst specifically developed to produce HCN from alcohols, nitriles and mixtures thereof under conditions close to those currently used for AN production from propylene. The preferred alcohol is methanol. The preferred nitrites are propionitrile (PN) and acetonitrile (ACN). The mixtures may include mixtures of nitrites or mixtures of nitrites and alcohols. The process includes passing a feed gas, either alcohol or nitrile or mixtures thereof, along with ammonia and oxygen into a reaction zone in the presence of the modified Mn—P catalyst.

The promoters K, Ca, Mo, Zn, and Fe can be added to improve the performance of unmodified Mn—P catalysts, such as those described in U.S. Pat. No. 4,457,905. The modified Mn—P catalysts made with K and Ca have a better selectivity to HCN, resulting in HCN yields that are 2-3% higher than those for the unmodified Mn—P catalyst. The Mo modified Mn—P catalyst has much higher activity than the unmodified Mn—P catalyst and would require less catalyst to be used for a given methanol feed. The Zn modified Mn—P catalyst has higher activity and selectivity than the unmodified Mn—P catalyst, allowing less catalyst to be used for the feed, maintaining high methanol conversion, and delivering very high HCN yields.

Unlike previous catalysts, the modified Mn—P catalysts in accordance with the present invention can be used with an expanded range of suitable feeds to the reactor such as nitrites or mixtures of nitrites and alcohols. The Fe modified Mn—P catalyst gives much better performance with a propionitrile feed than the unmodified Mn—P catalyst.

DETAILED DESCRIPTION OF THE INVENTION

The present invention provides a process for ammoxidation of alcohols, such as methanol, and/or nitrites, such as propionitrile (PN) and acetonitrile (ACN) feed to hydrogen cyanide comprising passing said feed along with ammonia and oxygen or oxygen-containing gas into a reaction zone operated at ammoxidation conditions and containing catalytically effective amounts of a modified Mn—P catalyst having the following empirical formula:

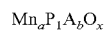

$$Mn_aP_1A_bO_x$$

where A=one or more of K, Ca, Mo, Zn, Fe or mixtures thereof; a=1 to 1.5; b 0.01 to 1.0 and x is a total number of oxygen atoms determined by the oxidation states of the other elements present.

In a more limited embodiment, the present invention provides a process for the ammoxidation of methanol to hydrogen cyamide comprising feeding to an ammoxidation reactor operated at ammoxidation reaction conditions, a feed containing methanol, ammonia and oxygen or oxygen-containing gas and wherein the ammoxidation reaction zone contains a fluidized bed of ammoxidation catalyst comprising a modified Mn—P catalyst having the following empirical formula:

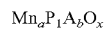

$$Mn_aP_1A_bO_x$$

where A=one or more of K, Ca, Mo, Zn, Fe or mixtures thereof; a=1 to 1.5; b=0.01 to 1.0 and x is a total number of oxygen atoms determined by the oxidation states of the other elements present.

The modified Mn—P catalyst is generally prepared by conventional means. Preferably, the modified Mn—P catalyst is prepared by the procedure disclosed in U.S. Pat. No. 4,457,905, wherein an unmodified Mn—P dry catalytic material is impregnated with different metal salts. Different metals can be also introduce into the slurry before milling or before spray drying from aqueous solutions of their soluble salts. In a preferred embodiment, the modified Mn—P catalyst is prepared using a wet impregnation method for the introduction of different metals such as Ca, K, Mo, Fe, Zn from aqueous solutions of their soluble salts into the unmodified Mn—P catalyst prepared according to U.S. Pat. No. 4,457,905 and pre-dried at 200° C. Wet impregnation is preferably followed by calcination. The calcination temperature can be from 850° to 1000° C. The contents of U.S. Pat. No. 4,457,905 are expressly incorporated herein by reference.

Although the catalyst can be used neat, the catalyst is preferably operated with a support. Preferred are inert supports such as silica ($SiO_2$), titania ($TiO_2$), alumina ($Al_2O_3$), and other commonly used supports. Especially preferred is silica. Preferably, silica is added during the catalyst preparation in two steps. First, a small amount of silica is mixed with the active catalytic components and the mixture is stirred for 1 to 3 hours at 80 to 100° C. Then, the rest of the silica support is added. This two-step addition of silica results in a better activity of the catalyst, and an increased HCN yield.

The manganese compounds that can be used include any manganese compounds that can be incorporated into a catalyst. Preferred compounds include manganese acetate, nitrate, oxide, chloride and similar compounds.

The phosphorus compounds that can be used include any phosphorus compounds that are known in the art, including phosphorous (V) oxide, orthophosphoric acid, ammonium dihydrogen phosphate, ammonium monohydrogen phosphate, and similar compounds.

The ammoxidation reaction conditions used are those disclosed in the art for the ammoxidation of methanol, typically, temperatures of 200 to 600° C., with better results obtained at 250 to 550° C., and best results being obtained at 300 to 500° C.

The molar ratio of reactants in the ammoxidation reaction zone is conventional. Usually, the molar ratio of ammonia and oxygen to methanol or nitrile is near stoichiometric so that most of the reactants will be consumed in the reaction. Usually, the ratio of ammonia to methanol or nitrile is 0.7:1 to 2:1, preferably 0.9:1 to 1.3:1. Use of excess ammonia is not desirable because the unreacted ammonia must be recovered and recycled, or wasted.

Air is the preferred oxygen source because it is inexpensive; however, pure oxygen or oxygen-enriched air may also be used. Flammable mixtures should be avoided.

Inert diluents may be present, and their use is common in laboratories, but not common commercially, except for nitrogen which is usually carried along with the air supplying oxygen to the reaction zone.

Although fluidized bed operations are preferred, the operation process should work very well in a fixed bed, ebullating bed, or moving bed type of operation. Fluidized beds are preferred to minimize problems of hot spots and distribution within the bed. Fluidized bed operation also permits easy addition and withdrawal of catalyst if this is necessary for replacement or regeneration of the catalyst.

The following section provides details including preferred embodiments of the present invention. However, it should be understood that one of ordinary skill in the art could modify or adapt the various parameters provided without departing from the scope of the present invention.

All catalysts were initially prepared based on the disclosure provided in U.S. Pat. No. 4,457,905, the contents of which are expressly incorporated herein by reference, these un-modified catalysts are referred to herein as $Mn_aPO_x$/50% $SiO_2$ catalysts.

COMPARATIVE EXAMPLE

Manganese nitrate 51.3% aqueous solution, 336.68 g, was added to the reactor. Phosphoric acid 85%, 89.2 g, and 40% Nalco 2327 silica sol, 46.31 g, were added under vigorous agitation. The temperature was raised to 103-105° C., and the reaction mixture was heated until the volume was reduced to about 200 ml. This concentration step is essential for obtaining the desired density of the catalyst. The reaction mixture was cooled to room temperature, and additional 262.56 g of Nalco 2327 silica sol was added to the slurry. The slurry was milled for about 16 hours, dried, and calcined for 2 hours at 935° C.

In general the modified Mn—P catalyst, also referred to as the modified catalysts, were prepared using wet impregnation method for introduction of different metals such as Ca, K, Mo, Fe, Zn from aqueous solutions of their soluble salts into the catalyst pre-dried at 200° C. Wet impregnation was followed by calcination at two different temperatures 850° C. and 935° C. for 2 hours in the air.

EXAMPLE 1

A zinc-modified catalyst was prepared using the following procedure: 1 g of zinc nitrate with formula $Zn(NO_3)_2.6H_2O$ was dissolved in 9 ml of water. The solution was added to 20 g of dry catalytic material under agitation; the resulting material was dried at 110° C. The dry material was divided into 2 parts. One part was calcined at 850° C. 2 hours. The other part was calcined at 935° C. 2 hours. The catalysts had the following formula: $Mn_{1.25}P_1Zn_{0.046}O_x$/50% $SiO_2$

EXAMPLE 2

A Mo-modified catalyst was prepared using the following procedure: 10 g of $(NH_4)_6Mo_7O_{24}$ was dissolved in 20 ml of water. The solution was added to 20 g of dry catalytic under agitation; the resulting material was dried at 110° C. The dry material was divided into 2 parts. One part was calcined at 850° C. 2 hours. The other part was calcined at 935° C. 2 hours. The catalysts had the following formula: $Mn_{1.25}P_1Mo_{0.81}O_x$/50% $SiO_2$

EXAMPLE 3

A potassium-modified catalyst was prepared using the following procedure: 0.53 g of potassium hydrogenphthalate was dissolved in 10 ml of water. The solution was added to 20 g of dry catalytic material under agitation; the resulting material was dried at 110° C. The dry material was divided into 2 parts. One part was calcined at 850° C. 2 hours. The other part was calcined at 935° C. 2 hours. The catalysts had the following formula: $Mn_{1.25}P_1K_{0.036}O_x$/50% $SiO_2$

EXAMPLE 4

A zinc-modified catalyst was prepared using the following procedure: 2.7 g of zinc nitrate with formula $Zn(NO_3)_2.6H_2O$ was dissolved in 8 ml of water. The solution was added to 20 g of dry catalytic material under agitation; the resulting material was dried at 110° C. The dry material was divided into 2 parts. One part was calcined at 850° C. 2 hours. The other part was calcined at 935° C. 2 hours. The catalysts had the following formula: $Mn_{1.25}P_1Zn_{0.14}O_x$/50% $SiO_2$

EXAMPLE 5

A calcium-modified catalyst was prepared using the following procedure: 1 g of calcium nitrate with formula Ca(NO$_3$)$_2$.4H$_2$O was dissolved in 8 ml of water. The solution was added to 20 g of dry catalytic material under agitation; the resulting material was dried at 110° C. The dry material was divided into 2 parts. One part was calcined at 850° C. 2 hours. The other part was calcined at 935° C. 2 hours. The catalysts had the following formula: Mn$_{1.25}$P$_1$Ca$_{0.14}$O$_x$/50% SiO$_2$.

Catalyst Performance Tests

All samples were tested in the methanol ammoxidation reaction. All the tests were done in a ⅜" stainless steel fluidized bed tubing reactor. The test performance data are presented in Table 2.

Methanol conversion ($X_{CH3OH}$) was calculated using the following formula:

$$X_{CH3OH}=1-[CH_3OH]_{out}/([CH_3OH]_{out}+[CO]_{out}+[CO_2]_{out}+[HCN]_{out})\times 100\%,$$

where [CH$_3$OH]$_{out}$, [CO]$_{out}$, [CO$_2$]$_{out}$, [HCN]$_{out}$ are concentrations (vol. %) in the reactor effluent.

Hydrogen cyanide selectivity ($S_{HCN}$) was calculated using the following formula:

$$S_{HCN}=[HCN]_{out}/([CO]_{out}+[CO_2]_{out}+[HCN]_{out})\times 100\%.$$

Hydrogen cyanide yield ($Y_{HCN}$) was calculated using the following formula:

$$Y_{HCN}=(mol[HCN]\ formed/mol[CH_3OH]\ in\ feed)\times 100\%$$

W/F g.s/(STP m1) is the contact time where W is weight of a catalyst; F is total inlet feed of gases.

Table 2. Feed composition (in mol. %), W/F (g*s/STPm1) and the results of the performance testing

TABLE 2

Feed composition (in mol. %), W/F (g * s/STPml) and the results of the performance testing

| reactor T, ° C. | W/F | NH$_3$ | CH$_3$OH | O$_2$ | CH$_3$OH conversion, % | HCN selectivity, % | HCN yield, % |
|---|---|---|---|---|---|---|---|
| Comparative example, unmodified catalyst, calcination temperature 935° C. | | | | | | | |
| 445 | 5.8 | 19.21 | 17.57 | 28.04 | 98.5 | 82.4 | 81.1 |
| 452 | 5.8 | 19.21 | 17.57 | 28.04 | 99.1 | 81.8 | 81.1 |
| 438 | 5.8 | 19.21 | 17.57 | 28.04 | 98.4 | 82.2 | 80.9 |
| Example 1, Zn-modified catalyst, calcination temperature 935° C. | | | | | | | |
| 438 | 4.9 | 18.33 | 16.59 | 28.20 | 96.56 | 85.25 | 83.15 |
| 418 | 4.9 | 18.33 | 16.59 | 28.20 | 93.60 | 86.45 | 82.65 |
| 428 | 4.9 | 18.33 | 16.59 | 28.20 | 97.01 | 89.58 | 86.88 |
| 448 | 4.9 | 18.33 | 16.59 | 28.20 | 99.05 | 89.01 | 88.17 |
| 470 | 4.9 | 18.33 | 16.59 | 28.20 | 99.86 | 93.48 | 93.35 |
| Example 1, Zn-modified catalyst, calcination temperature 850° C. | | | | | | | |
| 438 | 4.9 | 18.56 | 16.69 | 28.06 | 99.64 | 83.54 | 83.27 |
| 418 | 4.9 | 18.56 | 16.69 | 28.06 | 99.05 | 86.26 | 85.44 |
| 428 | 4.9 | 18.56 | 16.69 | 28.06 | 99.62 | 85.30 | 84.97 |
| Example 2, Mo-modified catalyst, calcination temperature 935° C. | | | | | | | |
| 425 | 5.8 | 19.48 | 18.05 | 27.64 | 99.6 | 81.5 | 81.1 |
| 418 | 5.8 | 19.48 | 18.05 | 27.64 | 99.5 | 81.4 | 81.0 |
| Example 2, Mo-modified catalyst, calcination temperature 850° C. | | | | | | | |
| 438 | 3.87 | 19.26 | 17.85 | 28.14 | 99.2 | 82.1 | 81.4 |
| 425 | 3.87 | 19.26 | 17.85 | 28.14 | 98.9 | 83.4 | 82.5 |
| Example 3, Mo-modified catalyst, calcination temperature 935° C. | | | | | | | |
| 438 | 5.8 | 18.82 | 17.45 | 28.58 | 94.8 | 87.1 | 82.6 |
| 445 | 5.8 | 18.82 | 17.45 | 28.58 | 96.1 | 86.3 | 83.0 |
| 452 | 5.8 | 18.82 | 17.45 | 28.58 | 97.2 | 86.0 | 83.6 |
| Example 4, Zn-modified catalyst, calcination temperature 935° C. | | | | | | | |
| 438 | 4.9 | 18.46 | 16.09 | 28.36 | 97.21 | 89.93 | 88.10 |
| 418 | 4.9 | 18.46 | 16.09 | 28.36 | 94.93 | 91.47 | 86.83 |
| 428 | 4.9 | 18.46 | 16.09 | 28.36 | 97.82 | 90.93 | 88.79 |
| 448 | 4.9 | 18.46 | 16.09 | 28.36 | 99.03 | 89.66 | 89.01 |
| 458 | 4.9 | 18.46 | 16.09 | 28.36 | 99.66 | 87.52 | 87.28 |
| 438 | 4.9 | 18.46 | 16.09 | 28.36 | 98.69 | 90.04 | 89.13 |
| Example 5, Ca-modified catalyst, calcination temperature 935° C. | | | | | | | |
| 450 | 5.8 | 18.15 | 16.51 | 26.86 | 95.9 | 87.7 | 84.1 |

Promoters K, Ca, Mo, Zn, and Fe have been added to improve the performance of the catalyst described in U.S. Pat. No. 4,457,905. The catalysts made with K and Ca have a better selectivity to HCN, resulting in HCN yields that are 2-3% higher than for the unmodified catalyst. The catalyst modified with Mo has much higher activity than the unmodified catalyst and would require less catalyst to be used for a given methanol feed. The Zn-modified catalyst has higher activity and selectivity than the unmodified catalyst, allowing less catalyst to be used for the feed, maintaining high methanol conversion, and delivering very high HCN yields.

For the commercial application, it is important to have near complete conversion of methanol. The increased activity of the Zn-modified Mn—P catalyst is an advantage compared to the unmodified catalyst because it allows a higher concentration of methanol in the feed than was disclosed in U.S. Pat. No. 4,457,905. In the present invention, all of the examples were tested without the addition of steam used to increase the HCN selectivity of the unmodified Mn—P catalyst described in U.S. Pat. No. 4,457,905. Not requiring the steam to increase yields provides another advantage for the modified Mn—P catalyst according to the present invention.

Unlike previous catalysts, the modified Mn—P catalysts in accordance with the present invention can be used with an expanded range of suitable feeds to the reactor such as nitrites or mixtures of nitrites and alcohols. The Fe-modified Mn—P catalyst gives much better performance with a propionitrile feed than the unmodified catalyst. The following Example was conducted including propionitrile (PN) as a nitrile feed.

Example Using Nitrile Feed

A 50:50 by weight methanol and propionitrile (PN) feed was fed to the reactor including the catalyst as described in U.S. Pat. No. 4,457,905 modified with Fe. It was discovered that 50/50 methanol/PN is converted to HCN with about the same yield as pure methanol, i.e. about 70-72%. The conversion of PN is essentially 100%, in addition to HCN the product stream contains CO, $CO_2$, and minor impurities.

When using a pure PN feed, it was found that a pure Mn—P catalyst makes hardly any HCN from PN in the range of 350 to 450° C., while an iron-modified Mn—P catalyst gives about 50% HCN yield (calculated based on C) even at 350° C.

Although the present invention has been disclosed in terms of a preferred embodiment, it will be understood that numerous additional modifications and variations could be made thereto without departing from the scope of the invention as defined by the following claims:

What is claimed is:

1. A process for the ammoxidation of an alcohol or nitrile or an alcohol and nitrile mixture feed to hydrogen cyanide comprising passing said feed along with ammonia and oxygen into a reaction zone in the presence of a modified Mn—P catalyst having the following empirical formula:

$$Mn_aP_1A_bO_x$$

where

A=one or more of K, Ca, Mo, Zn, Fe or mixtures thereof;
a=1 to 1.5;
b=0.01 to 1.0 and
x is a total number of oxygen atoms determined by the oxidation states of the other elements present.

2. The process of claim 1, wherein the catalyst is on a support.

3. The process of claim 2, wherein the support is selected from the group consisting of $TiO_2$, $Al_2O_3$ and $SiO_2$.

4. The process of claim 3, wherein the support is $SiO_2$.

5. The process of claim 1, wherein said alcohol feed is methanol.

6. The process of claim 1, wherein said oxygen is supplied as air.

7. The process of claim 1, wherein said nitrile feed is propionitrile.

8. The process of claim 7, wherein A=Fe.

9. The process of claim 1, wherein said modified Mn—P catalyst is provided as a fluidized bed of catalyst.

10. A catalyst for the ammoxidation of an alcohol or nitrile or an alcohol and nitrile mixture feed to hydrogen cyanide having the following empirical formula:

$$Mn_aP_1A_bO_x$$

where

A=one or more of K, Ca, Mo, Zn, Fe or mixtures thereof;
a=1 to 1.5;
b=0.01 to 1.0 and
x is a total number of oxygen atoms determined by the oxidation states of the other elements present.

11. The catalyst of claim 10, wherein said catalyst is on a support.

12. The catalyst of claim 11, wherein the support is selected from the group consisting of $TiO_2$, $Al_2O_3$ and $SiO_2$.

13. The catalyst of claim 12, wherein the support is $SiO_2$.

* * * * *

UNITED STATES PATENT AND TRADEMARK OFFICE
CERTIFICATE OF CORRECTION

PATENT NO. : 7,763,225 B2  
APPLICATION NO. : 11/767555  
DATED : July 27, 2010  
INVENTOR(S) : Natalya Koryabkina et al.

It is certified that error appears in the above-identified patent and that said Letters Patent is hereby corrected as shown below:

In column 4, lines 25, 26 and 33, "nitrites" should read --nitriles--

In column 8, line 9, "W/F g.s/(STP ml)" should read --W/F g.s/(STP ml)--; line 11, "W/F (g*s/STPml)" should read --W/F (g*s/STPml)--

Signed and Sealed this

Twelfth Day of October, 2010

David J. Kappos  
*Director of the United States Patent and Trademark Office*